United States Patent Office 3,594,112
Patented July 20, 1971

3,594,112
DYEING, PADDING AND PRINTING OF SYNTHETIC POLYAMIDE FIBERS WITH AN ANTHRAQUINONE DYE
Jacques Guenthard, Binningen, Basel-Land, Switzerland, assignor to Sandoz Ltd. (also known as Sandoz A.G.), Basel, Switzerland
No Drawing. Continuation-in-part of application Ser. No. 607,142, Jan. 4, 1967. This application May 22, 1968, Ser. No. 731,327
Claims priority, application Switzerland, Feb. 2, 1966, 1,441/66; Mar. 16, 1966, 3,807/66
Int. Cl. C09b 1/00
U.S. Cl. 8—39   8 Claims

ABSTRACT OF THE DISCLOSURE

A dyeing, padding and printing process for polyamide fibers with the anthraquinone dye of the formula

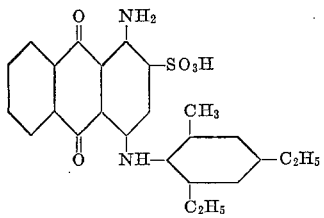

The present invention is a continuation-in-part application to our co-pending application Ser. No. 607,142, filed on Jan. 4, 1967, now abandoned, and relates to a dyeing, padding and printing process for polyamide fibers with an anthraquinone dye.

In U.S. Pat. 3,296,284 the production of acid anthraquinone dyes is described in several examples. In particular the dye of the formula

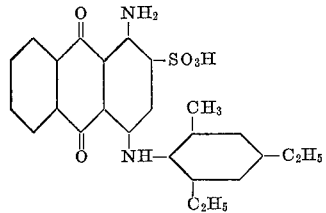

is disclosed in Example 16 in combination with Example 1.

The acid anthraquinone dyes disclosed in this patent are used as intermediates for synthesis of reactive dyes.

It has now been found that the acid anthraquinone dye having the formula given in the preceding paragraph can be employed for the dyeing, padding and printing of natural and synthetic polyamide fibers.

This present application thus relates to a process for the dyeing, padding or printing of textile materials consisting of natural or synthetic polyamide fibers, in which the acid anthraquinone dye of the formula

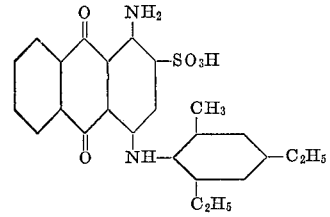 (1)

is employed.

The dye of Formula I is particularly suitable for the pad dyeing, i.e. the dyeing at short liquor ratios, of polyamide fibers as it has excellent water solubility.

In claim 15 of U.S. Pat. 2,121,928 an anthraquinone dye of the formula

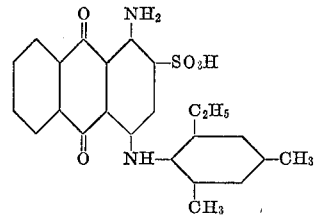 (a)

is described which is used for dyeing wool and other materials. Up to 35 grams of this dye can be dissolved in 1 liter of water at 90° C.

It was surprising and could not be foreseen that more than 100 grams of the dye of Formula I are soluble in 1 liter of water at 90° C. Because of this significantly greater solubility much more highly concentrated stock solutions of the dye of Formula I can be prepared than is possible with the dyestuff of Formula A. Stock solutions are important for dyeing as quantities containing the required amount of dye can be drawn off as and when required, without the dye having to be weighed out and dissolved in water for each new addition. This permits speedy and clean working, obviates inconvenient dusting in weighing out of dye, is an aid to measuring accuracy, and facilitates continuous operation.

The dye of this invention is suitable further for the dyeing, padding and printing of natural and regenerated cellulosic fibers and for dyeing and printing of leather.

The dyeings obtained on the aforenamed textile materials, in particular those on polyamide fiber, have very good light fastness, together with good fastness to other tests, such as water, milling, perspiration, sea water, rubbing, acids (e.g. acetic acid), alkalis (e.g. sodium carbonate), dry cleaning, pressing, bleaching, stoving, carbonizing and cross dyeing.

The main natural polyamide fibers are wool and silk. The synthetic polyamide fibers are polycondensation products of dibasic organic acids, e.g. adipic or sebacic acid, and hexamethylene-diamine, or of ω-aminoundecyclic acid or poly-ε-caprolactam.

It is desirable to employ the known dyeing methods with neutral to weakly acid baths at temperatures of 60° to 100° C. or advantageously above 95° C., e.g. 98–100° C., or at 100° to 200° C. under pressure, preferably 140–170° C.

Similarly the known padding and printing methods can be used, for instance, polyamide material can be padded under pressure and fixed in dry heat for 1 to 15 minutes or preferably 3–10 minutes. This thermofixation operation can likewise be carried out in the known way.

The dye of Formula I can be produced by reacting an anthraquinone compound of the formula

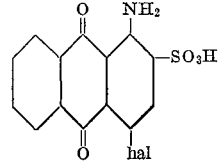 (II)

where hal represents chlorine or bromine, with an amine of the formula

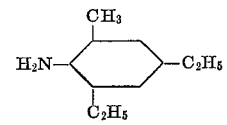 (III)

The dye of Formula I can also be obtained by reacting an anthraquinone dye of the formula

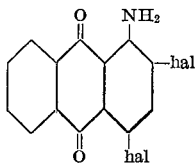

(IV)

where hal represents chlorine or bromine, with an amine of the Formula III to form the anthraquinone compound of the formula

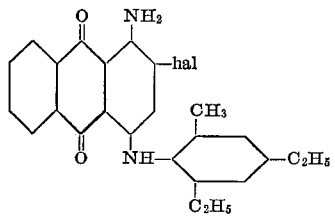

(V)

and converting this into the anthraquinone dye of Formula I by treatment with sulphite.

It is expedient to perform the reaction of a compound of Formula II or IV with the amine of Formula III in water at elevated temperature, but it can be carried out in an aqueous-organic medium or an organic medium at temperatures of this order. The reaction with a sulphite is effected preferably under pressure at elevated temperatures up to 140° C.

In the following examples the parts and percentages are by weight and the temperatures in degrees centigrade.

EXAMPLE 1

A dyebath is prepared with a solution of 1 part of the dye of the formula

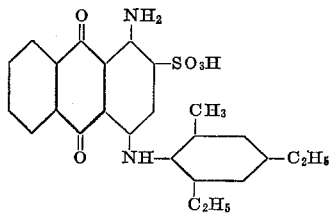

(I)

in 100 parts of water and additions of 2 parts of ammonium sulphate and 4 parts of 40% acetic acid solution. The bath is raised to 60°, at which temperature 100 parts of wool are entered into it and dyed for 1 hour at the boil. A brilliant blue dyeing is obtained which has very good fastness properties.

A dyeing with similarly good properties is obtained when 100 parts of a synthetic polyamide material, e.g. nylon, are dyed in place of 100 parts of wool.

EXAMPLE 2

A wool fabric, previously wetted out and hydro-extracted, is padded at 25° with a padding liquor containing 60 parts of the dye of Formula I in 1000 parts of water and expressed to contain 80% of its weight of the liquor. It is pre-dried at 70° and thermofixed for 5 minutes at 150°. A brilliant blue dyeing with good fastness properties is obtained.

A dyeing with similarly good properties is obtained when a synthetic polyamide material, e.g. nylon, is padded in place of wool.

EXAMPLE 3

A printing paste is prepared with 20 parts of the dye of Formula I, 30 parts of thiodiethylene glycol, 80 parts of urea, 500 parts of a 5% aqueous locust bean gum thickening, 60 parts of a 30% aqueous ammonium tartrate solution, 5 parts of a nonylphenyl polyglycol ether bearing 4.5 ethylene oxide groups, and 305 parts of water. This paste is printed by one of the conventional block or machine printing processes on a chlorinated or unchlorinated wool muslin fabric. The fabric is dried, steamed with saturated steam for 40 minutes, rinsed with cold water and dried. A brilliant blue print with good fastness properties is obtained.

EXAMPLE 4

A printing paste for nylon fabric is prepared with 20 parts of dye, 50 parts of thiodiethylene glycol, 500 parts of a 30% aqueous crystal gum thickening, 60 parts of thiourea, 60 parts of a 20% aqueous ammonium sulphate solution and 300 parts of water. The paste is printed on a nylon fabric by one of the conventional printing processes and the fabric is then dried, steamed for 35–40 minutes, soaped at 60°, rinsed and dried. A brilliant blue print with good fastness properties is obtained.

EXAMPLE 5

A printing paste for texturized nylon fabric is prepared with the following additions: 20 parts of dye, 50 parts of urea, 500 parts of a 16% aqueous locust bean gum thickening, 60 parts of a 30% aqueous ammonium sulphate solution, 10 parts of a nonylphenyl polyglycol ether bearing 4.5 ethylene oxide groups, and 360 parts of water. A texturized nylon fabric, e.g. "Banlon" (registered trademark) or "Helanca" (registered trademark), is printed with this paste in accordance with the procedure of Example 4 and washed off in the same way. A brilliant blue print with good fastness properties is obtained.

The dye of Formula I can be produced according to the following procedure:

Into a mixture of 100 parts of water and 50 parts of ethyl alcohol are entered 19.2 parts of 1-amino-4-bromoanthraquinone-2-sulphonic acid in the form of the sodium salt, 20 parts of 2-amino-1-methyl-3,5-diethylbenzene, 20 parts of sodium bicarbonate and 1 part of copper benzene. The whole is maintained at 77–78° for 5 hours. After this time the ethyl alcohol and the excess 2-amino-1-methyl-3,5-diethylbenzene are distilled off with water vapour, and the 1-amino-4-(2',4'-diethyl-6'-methyl)-phenylaminoanthraquinone-2-sulphonic acid is precipitated at room temperature by the addition of sodium chloride. It is filtered off, washed with a 1% sodium chloride solution and dried at 100°.

The 2-amino-1-methyl-3,5-diethylbenzene can be prepared as follows: 148 parts of 1-methyl-3,5-diethylbenzene are dissolved in 122 parts of acetic anhydride and 66 parts of 98% nitric acid are added to the solution at 20° in the course of 1½ hours. The mixture is raised to 50° and held at this temperature for 4 hours to complete nitration. Fractional distillation at 134–139° (torr. 13) yields 150 parts of 1-methyl-2-nitro-3,5-diethylbenzene. 300 parts of this compound, 10 parts of Raney nickel and 10 parts of ethyl alcohol are entered into an autoclave, and reduction is effected with hydrogen of 40 to 50 atmospheres at 95–140° until such time as no further drop in pressure occurs. By fractional distillation at 123–124° (torr. 10) 240 parts of 2-amino-1-methyl-3,5-diethylbenzene are obtained.

The dye of Formula I can also be produced by the following procedure.

38.1 parts of 1-amoino-2,4-dibromoanthraquinone, 1 part of cuprous chloride and 25 parts of sodium carbonate are entered into 100 parts of 1-amino-2-methyl-4,6-diethylbenzene. The temperature is raised to 110° and the mixture stirred at this temperature for 16 hours, after which the excess 1-amino-2-methyl-4,6-diethylbenzene is distilled off under reduced pressure. 100 parts of ethylene diamine are added to the reaction product. The mixture is stirred for 1 hour at 80° and then cooled to 20–25°, on which the resulting 1-amino-2-bromo-4-(2',4'-diethyl-6'-methyl)-phenylaminoanthraquinone is filtered off, washed with ethylene diamine and water, and dried at 100°. It dissolves in organic solvents to give solutions of bluish violet colour.

16 parts of caustic potash are dissolved in 75 parts of water and the solution is neutralised with 18 parts of sulphurous acid. It is run into an autoclave, and 200 parts of phenol and 46.3 parts of 1-amino-2-bromo-4-(2′,4′-diethyl-6′-methyl)-phenylaminoanthraquinone are added to it. The mixture is maintained at 145° for 16 hours. To purify the dye, the phenol is blown off with water vapour and the dye precipitated from the aqueous solution with sodium chloride.

Having thus disclosed the invention what I claim is:

1. In the printing of linear synthetic polyamide with an acid dye, the improvement wherein the acid dye is the dye of the formula

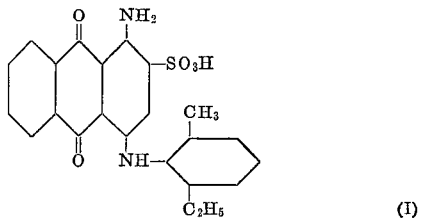

(I)

2. Synthetic polyamide printed according to the process of claim 1.

3. In printing synthetic polyamide fiber with an anthraquinone dyestuff maintained in a concentrated stock solution, the improvement wherein the anthraquinone dyestuff has a water-solubility at 90° C. in excess of 100 grams per liter and the printing is according to claim 1.

4. A process according to claim 1 wherein the polyamide is a polycondensation product of ω-aminoundecylic acid.

5. A process according to claim 1 wherein the polyamide is a polycondensation product of ε-caprolactam.

6. A process according to claim 1 wherein the polyamide is a polycondensation product of dibasic organic acid with hexamethylenediamine.

7. A process according to claim 1 wherein the polyamide is a polycondensation product of adipic acid with hexamethylenediamine.

8. A process according to claim 1 wherein the polyamide is a polycondensation product of sebacic acid with hexamethylenediamine.

References Cited
UNITED STATES PATENTS

| | | | |
|---|---|---|---|
| 2,121,928 | 6/1938 | Peter | 260—374 |
| 3,296,284 | 1/1967 | Schoenuer | 260—372 |

GEORGE F. LESMES, Primary Examiner

P. C. IVES, Assistant Examiner

U.S. Cl. X.R.

260—372, 374

UNITED STATES PATENT OFFICE
CERTIFICATE OF CORRECTION

Patent No. 3,594,112      Dated July 20th, 1971

Inventor(s) JACQUES GUENTHARD

It is certified that error appears in the above-identified patent and that said Letters Patent are hereby corrected as shown below:

Column 3, line 9, "(IV)" should read --(IV),--. Column 4, line 39, "benzene" should read --bronze--; line 64, "amoino" should read --amino--. Column 5, line 22, in the formula, "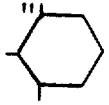" should read --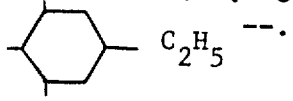 $C_2H_5$ --.

Signed and sealed this 31st day of October 1972.

(SEAL)
Attest:

EDWARD M. FLETCHER, JR.           ROBERT GOTTSCHALK
Attesting Officer                 Commissioner of Patents